(12) United States Patent
Chanfreau et al.

(10) Patent No.: US 7,984,700 B2
(45) Date of Patent: Jul. 26, 2011

(54) CONTROL VALVE FOR COOLING CIRCUIT

(75) Inventors: Matthieu Chanfreau, Saulx Marchais (FR); Daniel Virey, Les Essarts le Roi (FR)

(73) Assignee: Valeo Thermique Moteur, Le Mesnil Saint Denis (FR)

(*) Notice: Subject to any disclaimer, the term of this patent is extended or adjusted under 35 U.S.C. 154(b) by 0 days.

(21) Appl. No.: 11/430,381

(22) Filed: May 9, 2006

(65) Prior Publication Data

US 2006/0201455 A1 Sep. 14, 2006

(51) Int. Cl.
*F01P 7/14* (2006.01)
(52) U.S. Cl. .................. 123/41.1; 123/41.08; 123/41.09
(58) Field of Classification Search .................. 123/41.1, 123/41.02, 41.04, 41.06, 41.08, 41.09; 236/34.5; 137/625.46, 625.47, 625.15, 887
See application file for complete search history.

(56) References Cited

U.S. PATENT DOCUMENTS

| | | | | |
|---|---|---|---|---|
| 5,529,026 A | * | 6/1996 | Kurr et al. | 123/41.1 |
| 5,617,815 A | * | 4/1997 | Spies et al. | 123/41.1 |
| 6,164,248 A | * | 12/2000 | Lehmann | 123/41.1 |
| 6,539,899 B1 | * | 4/2003 | Piccirilli et al. | 123/41.1 |
| 2004/0103947 A1 | * | 6/2004 | McLane et al. | 137/625.47 |
| 2004/0238159 A1 | * | 12/2004 | Humburg | 165/41 |

FOREIGN PATENT DOCUMENTS

GB 2051311 A * 1/1981
WO WO 2004/061342 A1 * 7/2004

* cited by examiner

*Primary Examiner* — Michael Cuff
*Assistant Examiner* — Hung Q Nguyen
(74) *Attorney, Agent, or Firm* — Howard & Howard Attorneys PLLC

(57) ABSTRACT

A control valve that forms part of a cooling circuit comprising a first branch which contains a radiator and a second branch that constitutes a bypass of a radiator, and its method of use, are described.
When used in a motor vehicle combustion engine cooling circuit, the control valve has a third branch and has at least one unit heater for heating the vehicle cabin.

16 Claims, 8 Drawing Sheets

US 7,984,700 B2

CONTROL VALVE FOR COOLING CIRCUIT

FIELD OF THE INVENTION

The invention pertains to a control valve for a motor vehicle combustion engine cooling circuit, as well as to the circuit thus obtained.

It relates more particularly to a control valve suitable for forming part of a cooling circuit traversed by a cooling fluid and comprising a first branch which contains the radiator for cooling the engine, a second branch which constitutes a bypass of the engine cooling radiator, and one or more third branches which each contain at least one unit heater for heating the cabin.

Conventionally, the cooling fluid is water plus an antifreeze, which circulates in a closed circuit under the action of a circulation pump.

Such a cooling circuit uses, in a conventional manner, a thermostatic valve which comprises a fluid inlet connected to the outlet of the engine and two fluid outlets which correspond, respectively, to the branch containing the cooling radiator and to the branch forming a bypass.

During cold starting of the engine, and as long as the temperature of the cooling fluid has not reached a certain threshold, the valve circulates the cooling fluid around the bypass branch, short-circuiting the cooling radiator. As soon as the temperature of the cooling fluid reaches and exceeds the aforesaid threshold, the cooling fluid passes through the cooling radiator and detours around the bypass branch.

Generally, the cooling fluid circulates continuously around the branch that contains the unit heater, the heating of the cabin then being obtained by mixing of a cold air stream and of a hot air stream that has swept this unit heater. It is also known to provide a separate valve on the unit heater for adjusting the flow rate of cooling fluid that passes through it.

Thus, the known cooling devices require complex means for effecting the distribution of the cooling fluid between the three aforesaid branches, as a function of the engine operating conditions and of the comfort conditions desired by the occupant or occupants of the vehicle.

One of the aims of the invention is to provide a valve allowing independent management of the flow rates of the cooling fluid in the various branches of the engine cooling circuit.

The invention is also aimed at producing such a valve that makes it possible to optimize and to improve the various functions, in particular while the temperature of the combustion engine is rising and when cabin heating is desired, and also in the event of overheating of the engine.

The invention is also aimed at providing such a valve that possesses a motorized manner of operation and that possesses a more dependable manner of operation than conventional thermostatic valves.

To this end, the invention proposes a control valve of the type defined in the introduction, which comprises a body having a fluid inlet, a first outlet connected to the first branch of the circuit, a second outlet connected to the second branch of the circuit and at least one third outlet connected to the third branch or branches, as well as an adjustment member mounted rotatably in the valve body so as to selectively control the outlets, this adjustment member being suitable for taking in succession at least the following positions when it is rotated in a given direction;

a "bypass" position, at which the first outlet is open;
a "radiator+bypass" position, at which the first outlet and the second outlet are open;
a "radiator" position, at which the second outlet is open;
a "radiator+unit heater" position, at which the second outlet and the third outlet are open;
a "radiator+bypass+unit heater" position, at which the first outlet, the second outlet and the third outlet are open;
a "unit heater+bypass" position, at which the first outlet and the third outlet are open;
a "unit heater" position, at which the third outlet is open;
a "zero flow rate" position, at which no outlet is open.

The positions indicated above correspond to those occurring in sequence, when the adjustment member is rotated in the valve body, in a given direction.

However, it should be understood that the adjustment member may be brought directly into one of the above positions as a function of a particular desired mode.

Advantageously, the adjustment member is suitable for furthermore taking a "safety" position which corresponds either to the "radiator" position, at which the second outlet is open, or to the "radiator+unit heater" position, at which the second outlet and the third outlet are open.

These safety positions favor the cooling of the engine while allowing the heat of the engine to be dissipated, either across the radiator alone, or across the radiator and the unit heater.

According to another characteristic of the invention, the control valve comprises control means suitable for bringing the adjustment member
either into one of the positions: "bypass", "radiator+bypass", "radiator", when a no-heating mode is desired,
or into one of the positions: "radiator+unit heater", "radiator+bypass+unit heater", "unit heater+bypass", "unit heater", when a with-heating mode is desired.

According to yet another characteristic of the invention, the fluid outlets run into the body through openings of chosen shapes and dimensions, made at chosen locations of said body.

Preferably, the openings of the fluid outlets are of circular general shape and have different diameters.

In a preferred embodiment of the invention, the body comprises a cylindrical lateral wall into which the fluid outlets run at axial heights and at angular positions that are chosen with respect to the axis of rotation of the adjustment member, while the fluid inlet runs axially into the body.

It is however possible to envisage an embodiment where the inlets and the outlets are reversed on the body; for example, the body may comprise three fluid inlets and one outlet.

In a preferred embodiment of the invention, the adjustment member is embodied in the form of a hollow cylinder comprising through-openings suitable for controlling the fluid outlets as a function of the angular position of the adjustment member with respect to the body.

It is however possible to envisage other types of adjustment members, and in particular a member of the disk type.

According to yet another characteristic of the invention, the control valve comprises motorization means suitable for driving the adjustment member so as to bring it into chosen angular positions with respect to the valve body. These motorization means may comprise, for example, a motor of the stepper or DC type.

Under another aspect, the invention relates to a cooling circuit for a motor vehicle combustion engine, which is traversed by a cooling fluid under the action of a circulation pump, which circuit comprises a control valve as defined previously, whose fluid inlet is connected to an intake for cooling fluid coming from the engine and whose first fluid outlet, second fluid outlet and third fluid outlet or outlets are connected, respectively, to a first branch which contains the cooling radiator for the engine, a second branch which constitutes the bypass of the cooling radiator, and one or more third branches which each contain at least one unit heater for heating the cabin.

In one preferred embodiment of the invention, this circuit comprises a mechanical circulation pump driven by the engine and/or an electric circulation pump able to be actuated by control means.

Preferably, the electric circulation pump is inserted into the third branch which contains the unit heater, and the control means are suitable for actuating the electric circulation pump in one of the following positions: "unit heater" position, "radiator+unit heater" position and "radiator+bypass+unit heater" position.

According to one embodiment the circuit in accordance with the invention may comprise two or three third branches each containing at least one unit heater.

Such an embodiment will find its applications particularly in vehicles in which one wishes to modulate the distribution of heat inside the cabin of the vehicle. It is then advantageous to be able to adjust the heat given off by each of the unit heaters. To do this, hitherto, the quantity of fluid passing through the unit heaters was regulated with the aid of separate actuators arranged on each of said third branches, the actuators generally being situated at the level of an air conditioning box into which the unit heaters are integrated.

In such a circuit, according to an advantageous embodiment of the valve in accordance with the invention, the heat given off by each unit heater may be adjusted without resorting to said actuators.

To do this, said valve is furnished for each third branch with a corresponding third outlet communicating with said third branch and the adjustment member is suitable for taking additional positions at which said third outlets are open or otherwise, selectively. It will thus be possible, as a function of the angular position of said member, to feed just one, several or all said third branches.

In the description which follows, given merely by way of example, reference is made to the appended drawings, in which.

Figure 3:
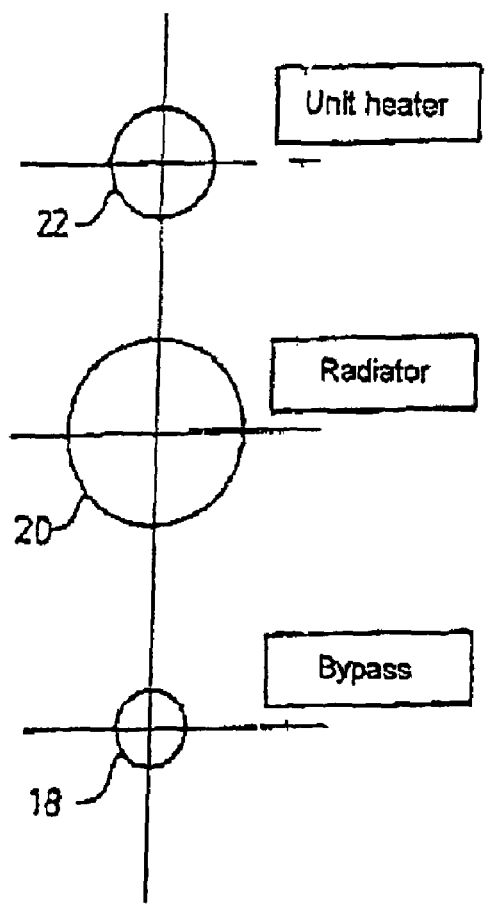
Figure 4:
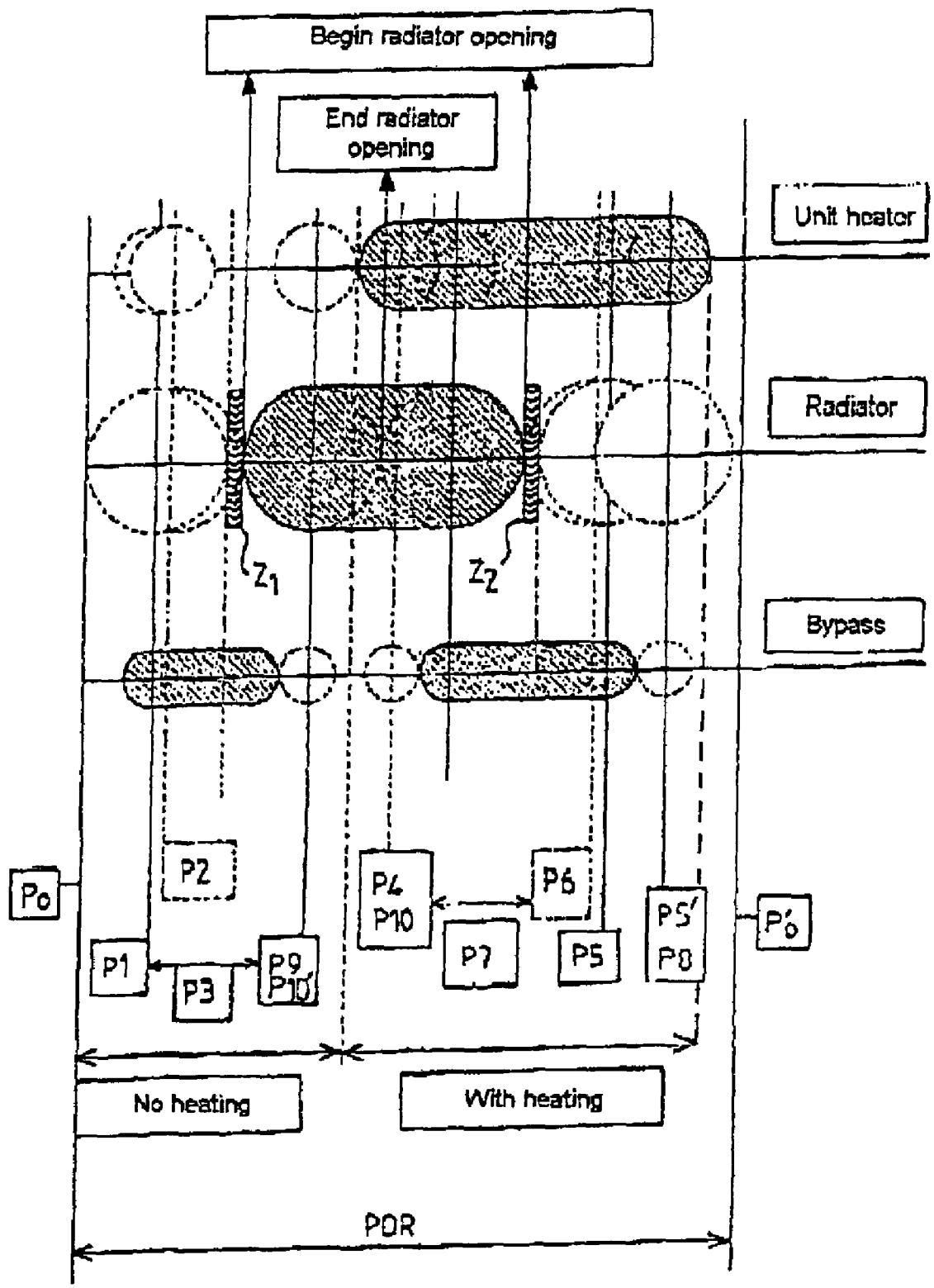
Figure 5:
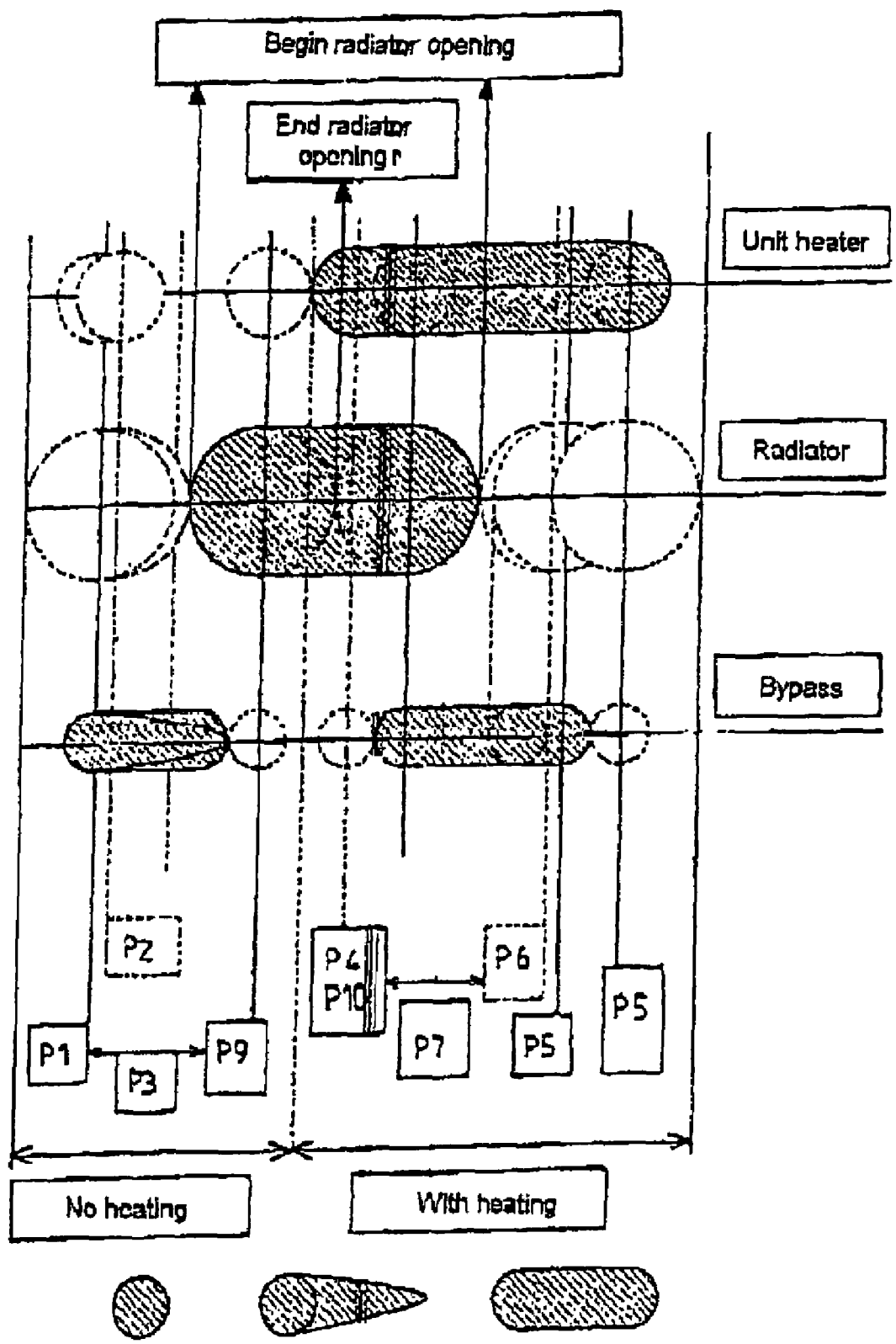
Figure 6:
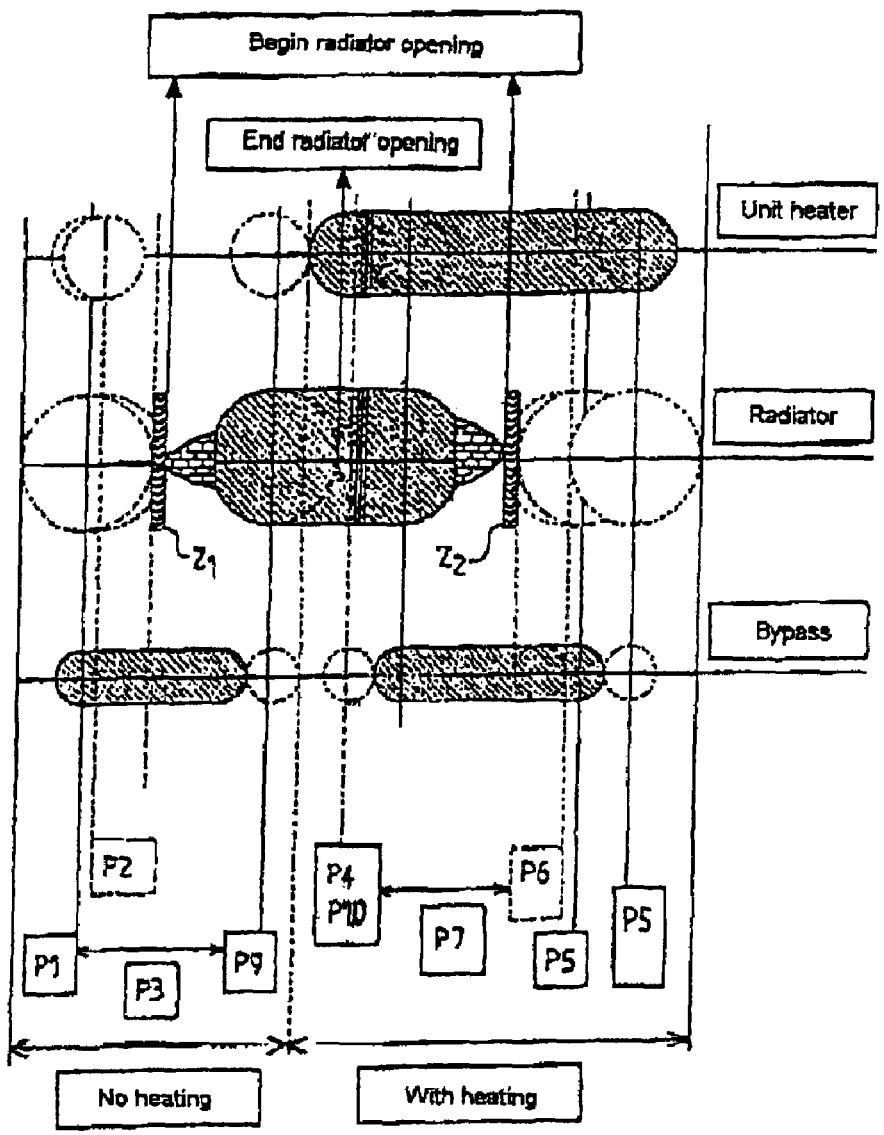
Figure 7:
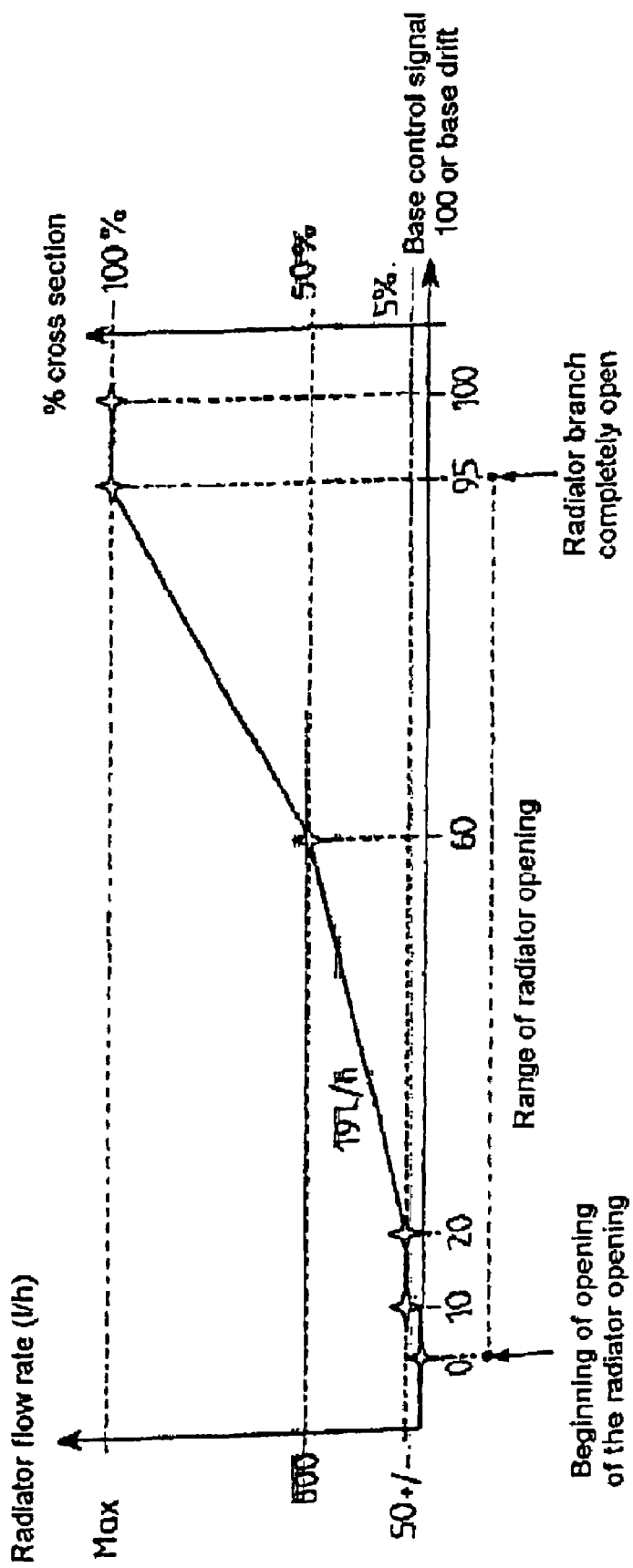
Figure 8:
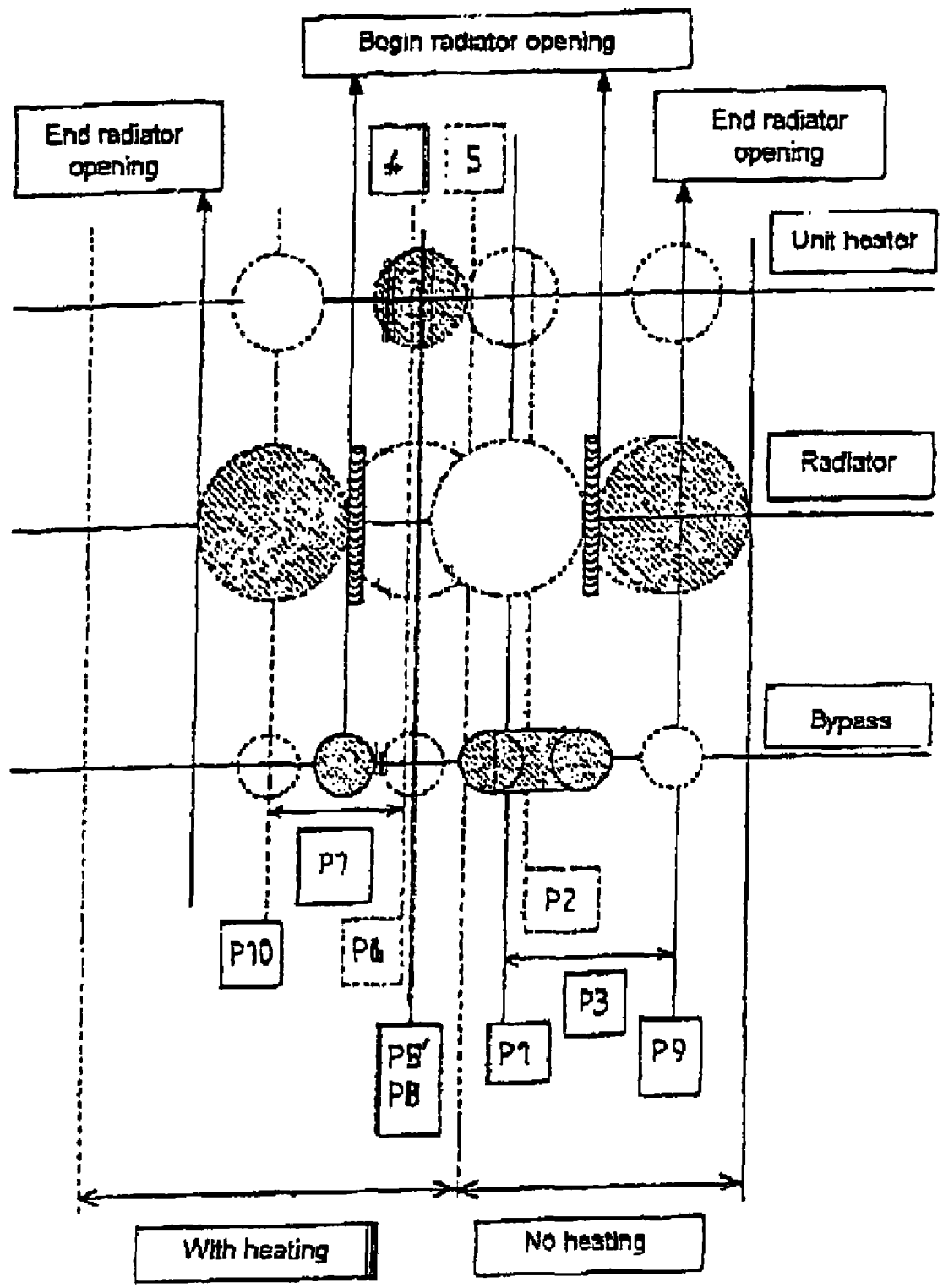
Figure 9:
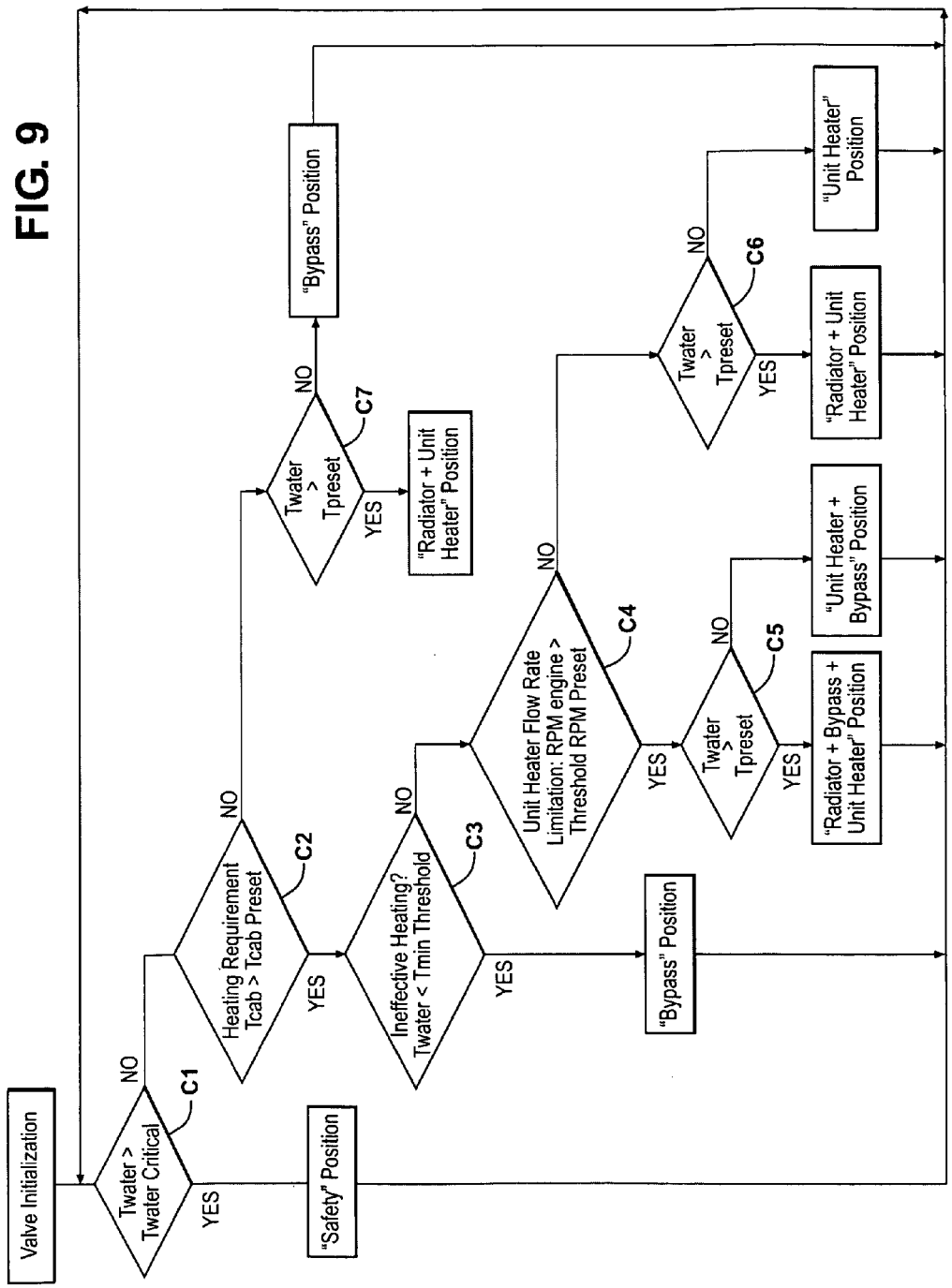

FIG. 3 diagrammatically illustrates the openings through which the three outlets of the valve run into the valve body;

FIG. 4 is a diagram showing a sequence of positions of the valve in a first embodiment of the invention;

FIG. 5 is a similar diagram in a variant embodiment;

FIG. 6 is a similar diagram in another variant embodiment;

FIG. 7 is a reference curve showing the progressiveness of the opening of the valve outlet which corresponds to the radiator;

FIG. 8 is a similar diagram to that of FIG. 4 in another embodiment of the invention; and FIG. 9 is a flow chart illustrating the manner of operation of the valve of the invention.

Figure 1:
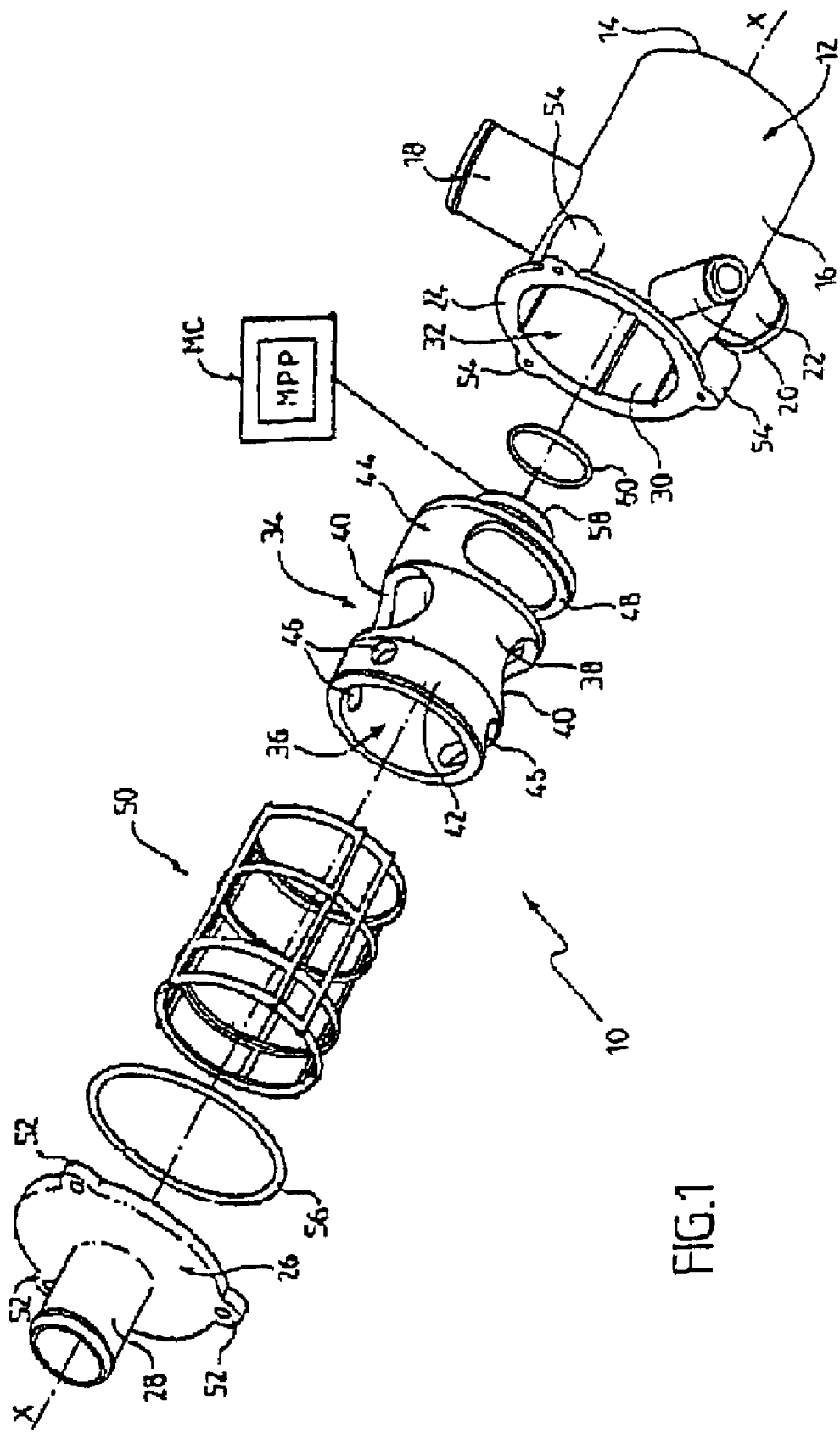
FIG. 1 is an exploded perspective view of a control valve according to the invention.

The control valve 10 represented in FIG. 1 comprises a body 12 of cylindrical general shape, delimited by a back wall 14 and a cylindrical wall 16 of axis XX. Into the cylindrical lateral wall 16 run three outlet nozzles 18, 20 and 22 at axial heights and at angular positions that are chosen with respect to the axis XX. In the example, the nozzles 18, 20 and 22 run radially into the wall 16 and they have different diameters, as may also be seen in FIG. 3.

In FIG. 3, which is a schematic representation, the openings corresponding to the nozzles, 18, 20 and 22 are aligned whereas, in reality, they are offset angularly as shown in FIG. 1.

The valve body 12 comprises a circular open face 24 intended to be closed by a cover 26 which is furnished with a fluid inlet nozzle 28, directed in the direction of the axis XX. The lateral wall 16 of the body 12 exhibits an inner cylindrical surface 30 delimiting a housing 32 for an adjustment member 34. The latter defines an interior cavity 36 able to be fed with fluid through the inlet nozzle 28 of the valve.

The adjustment member 34 is embodied in the form of a hollow cylinder able to rotate about the axis of rotation XX. It exhibits an intermediate cylindrical surface 38 furnished with two through-openings 40 and surrounded by two other cylindrical surfaces 42 and 44 situated at the end thereof. The cylindrical surface 42 is furnished with two through-openings 46, while the cylindrical surface 44 is furnished with one through-opening 48. The adjustment member is able to take various angular positions under the action of control means MC (represented diagrammatically) which comprise a motorization, for example a stepper or DC motor MPP. Thus, the adjustment member 34 can be brought into very precise angular positions, thereby making it possible to control the distribution of the fluid through the outlets 18, 20 and 22.

The seal between the adjustment member 34 and the interior surface 30 of the lateral wall 16 is provided by a leaktight seal 50 having the form of a cylindrical cage.

The cover 26 is furnished with three radial lugs 52 through which are intended to pass screws (not represented) cooperating with corresponding bosses 54 exhibited by the valve body.

A leaktight seal 56 of annular shape is arranged between the open face 24 of the body 12 and the cover 26. Moreover, the adjustment member 34 terminates in a tip 58 surrounded by a leaktight seal 60 and able to pass through an opening (not visible in FIG. 1) in the back 14 of the body 12. In this way, the adjustment member 34 can be rotated by the stepper motor MPP already cited.

Figure 2:
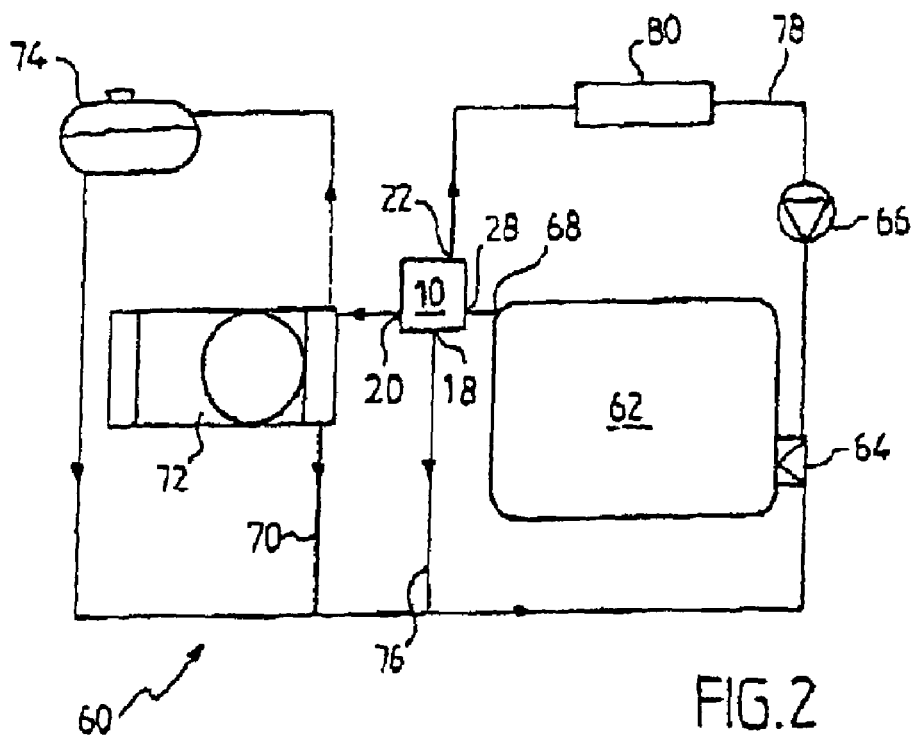
FIG. 2 is a diagram of a cooling circuit of a motor vehicle combustion engine, equipped with a control valve according to the invention.

Reference is now made to FIG. 2 which shows a circuit 60 for cooling a motor vehicle combustion engine 62. The circuit 60 is traversed by a cooling fluid, typically water plus an antifreeze, which circulates under the action of a mechanical pump 64 driven by the engine 62, possibly with the aid of an electric pump 66. The fluid heated by the engine, leaves the latter through an outlet 68 which is connected to the inlet nozzle 28 of a control valve 10 of the type described above.

This control valve comprises three outlet nozzles 18, 20 and 22 which are connected respectively to three branches of the circuit. The latter comprises a first branch 70 which contains a radiator 72 for cooling the engine 62 and an expansion tank 74, a second branch 76 which constitutes a bypass of the cooling radiator 72, and a third branch 78 which contains a unit heater 80 for heating the cabin of the vehicle. The electric pump 66 is inserted into the branch 78 which contains the unit heater 80.

The valve 10 allows independent management of the fluid flow rates in the branches 70, 76 and 78, so as to optimize the temperature of the combustion engine and the heating of the cabin, under maximum conditions of safety.

The outlets 18, 20 and 22 of the valve 10 are connected respectively to the branches 76, 70 and 78. The inlet 28 of the valve 10 is, preferably, connected directly and axially to the outlet 68 of the engine 62.

The actuator that operates the adjustment member 34 (in the example, the stepper motor MPP) is, preferably, an electric actuator that possesses a very small response time which in all cases is less than 1 second. It is then powered by the vehicle's electrical network and is controlled by a single wire, in analog or in digital. Diagnosis can be on the same wire as on the preset or on an independent wire in analog or digital.

The actuator is furnished with a member, for example a sensor, making it possible to ascertain its position in real time, so as to detect any drift or any malfunction.

As may be seen in FIG. 2, the three fluid outlets 18, 20 and 22 are perpendicular to the axis of rotation XX, while the fluid inlet 28 is arranged axially and opposite the engine so as to minimize the head losses, in the position where the valve is fully open.

In all the embodiments, the cross sections of the nozzles are dimensioned to allow good flow of the fluid, that is to say with constant section, with no bend and with progressive shapes.

The fluid outlet 20 (bypass) is situated nearest to the fluid inlet 28, so as to be able to integrate the valve 10 with the combustion engine 62, thereby also making it possible to do away with the link piece between the outlet 68 of the engine 62 and the inlet 28 of the valve 10.

The adjustment member 34, operated by the actuator MPP, orients and distributes the flow rate of the cooling fluid. The latter enters the cavity 36 of the adjustment member 34 via the inlet nozzle 28 and is distributed between the three outlets 18, 20 and 22 by the shape of the through-openings 40, 46 and 48 of the adjustment member 34. To each angular position of the adjustment member 34 there corresponds a well defined distribution.

In the example represented, the shapes of the through openings of the adjustment member 34 are delimited by circular arcs, but they may advantageously be modified to obtain a better progressiveness of the flow rates.

The sequence of the pathways or positions will now be described with reference to FIG. 1, in which the sequence of positions is represented diagrammatically and the through-openings 40, 46 and 48 of the adjustment member 34 are represented by gray hatched zones. The case represented shows a sequence where the three pathways or outlets are arranged one above the other, but all the angular arrangements of the three outlets are possible while keeping the same sequence. Only a reset is necessary.

If the adjustment member 34 is rotated in a given direction with respect to the body 12 of the valve, this member can take in succession at least the following positions:

- a "bypass" position P1, at which the first outlet 18 is open;
- a "radiator+bypass" position P2 or P3, at which the first outlet 18 and the second outlet 20 are open;
- a "radiator" position P9 or P10', at which the second outlet 20 is open;
- a "radiator+unit heater" position P4 or P10, at which the second outlet 20 and the third outlet 22 are open;
- a "radiator+bypass+unit heater" position P6 or P7, at which the first outlet 18, the second outlet 20 and the third outlet 22 are open;
- a "unit heater+bypass" position P5, at which the first outlet 18 and the third outlet 22 are open;
- a "unit heater" position P5' or P8, at which the third outlet 22 is open; and
- a "zero flow rate" position P0 or P0', at which no outlet is open.

The various aforesaid positions are designated by rectangles in FIG. 4. It is noted that the first three aforesaid positions, namely the "bypass", "radiator+bypass" and "radiator" positions correspond to a no-heating mode, while the other positions "radiator+unit heater", "radiator+bypass+unit heater", "unit heater+bypass" and "unit heater" correspond to a with-heating mode.

Also indicated by rectangles, at the top of the figure, are the beginning of the opening of the radiator and the end of the opening of the radiator. Leaktight zones Z1 and Z2 are situated between the open radiator and closed radiator branches. The perimeter of the adjustment member is designated diagrammatically by the letters POR.

The sequences of operations are given again in Table 1 below.

TABLE 1

| | Operating phases | EWP | Engine flow rate | Unit heater flow rate | Radiator flow rate | Bypass flow rate | Remarks |
|---|---|---|---|---|---|---|---|
| 1: | Cold starting, no heating | Off | Reduced: bypa | 0 | 0 | Qeng | Valve disabled |
| 2: | First valve opening, no heating | Off | Radia + bypa | 0 | Regulation | Regulation | |
| 3: | Regulation (engine T°), no heating | Off | Radia + bypa | 0 | Regulation | Regulation | |
| 4: | Vehicle stationary, engine off, no heating | On | Qewp: radia + unit htr | Qewp | Qpost cooling | 0 | Post-cooling assumption |
| 5: | Cold starting with heating, high engine revs | Off | Unit htr + bypa | Qheat max | 0 | Qtoo full | |
| 5': | Cold starting with heating, low engine revs | On | Unit htr | Qheat max | 0 | 0 | |
| 6: | First valve opening, with heating | On | Radia + bypa + unit htr | Qheat max | Regulation | Regulation | |
| 7: | Regulation (engine T°), with heating | On | Radia + bypa + unit htr | Qheat max | Regulation | Regulation | |
| 8: | Vehicle stationary, engine off, with heating | On | Unit htr | Qheat max | 0 | 0 | |
| 9: | Engine overheat at high revs | Off | Radia | 0 | Qmax | 0 | |
| 9': | Engine overheat at low revs | Off | Radia | 0 | Qmax | 0 | Risk of conflict EWP/mechanical pump |
| | | On | Radia + unit htr | Qunit htr | Qmax | 0 | |
| 10: | Safety (ditto 4) | On | Qewp: radia + unit htr | Qewp: safety flow rate | Qpost-cooling safety flow rate | 0 | Deicing + demisting and protection against engine overheat |

TABLE 1-continued

| Operating phases | EWP | Engine flow rate | Unit heater flow rate | Radiator flow rate | Bypass flow rate | Remarks |
|---|---|---|---|---|---|---|
| 10': Safety (ditto 9) | Off | Radia | 0 | Qmax | 0 | Engine cooling |
| 0: Cold starting with no engine flow rate | Off | 0 | 0 | 0 | 0 | Option |

In this table, the first column represents the various phases or modes of operation of the system, the second column represents operation (on) or shutdown (off) of the electric water pump EWP, the third column represents the engine flow rate, the fourth the unit heater flow rate, the fifth column the radiator flow rate, the sixth column the bypass flow rate and the seventh column some remarks. It should be noted that the adjustment member can take a "safety" position P10 or P10' which correspond respectively to the "radiator+unit heater" position, at which the second outlet 20 and the third outlet 22 are open and to the "radiator" position, at which the second outlet 20 is open.

This mode of operation favors the cooling of the engine by allowing the dissipation of the heat of the engine either across the radiator alone, or across the radiator and the unit heater.

FIG. 5 is a representation similar to FIG. 4. It differs from the latter essentially in the fact that the leaktight zones Z1 and Z2 have been dispensed with. Moreover, the shapes of the openings corresponding to the bypass have been substantially modified.

FIG. 6 corresponds to a variant of FIG. 4. The leaktight zones Z1 and Z2 are retained but the shape of the opening that corresponds to the radiator has been modified to improve the progressiveness.

Reference is now made to FIG. 7 which shows a curve of progressiveness of the opening of the outlet 20 (radiator outlet) of the valve 10 as a function of a base control signal 100.

This exemplary embodiment corresponds to flow cross sections having the following diameters: 20 mm for the outlet 20 (radiator), 20 mm for the outlet 18 of the bypass and 28 mm for the fluid inlet 28.

Here progressiveness is established for operation with a pressure of 1 bar and with a cooling fluid temperature of 23° C.±2° C. The flow rate of the radiator increases progressively from the beginning of opening of the radiator outlet (outlet 18) up to complete opening which corresponds to 100% of the flow cross section. Here the curve is based on straight line segments that link up with one another, but it could also be formed of a single straight line or of a polynomial.

Reference is now made to FIG. 8 which shows another sequence of simplified operation, which here begins with a mode with heating and then terminates in a mode without heating. The various positions are designated by the same symbols P1, P2, etc. as in FIGS. 4 to 6.

Here again one encounters the leaktight zones Z1 and Z2 between the open radiator and closed radiator branches. The corresponding manner of operation is illustrated by Table 2 below, in which the column headings are the same as in Table 1 mentioned above. Table 2, corresponding to FIG. 8, shows a sequence which allows gentle switchover from regulation with demand for heating to regulation with no demand for heating.

TABLE 2

| Operating phases | EWP | Engine flow rate | Unit heater flow rate | Radiator flow rate | Bypass flow rate | Remarks |
|---|---|---|---|---|---|---|
| 1: Cold starting, no heating | Off | Reduced: bypa | 0 | 0 | Qeng | Disabling of the valve |
| 2: First valve opening, no heating | Off | Radia + bypa | 0 | Regulation | Regulation | |
| 3: Regulation (engine T°), no heating | Off | Radia + bypa | 0 | Regulation | Regulation | |
| 4: Vehicle stationary, engine off, no heating | On | Qewp: radia + unit htr | Qewp | Qpost cooling | 0 | Post-cooling assumption |
| 5: Cold starting with heating, high engine revs | Off | Unit htr + bypa | Qheat max | 0 | Qtoo full | |
| 5': Cold starting with heating, low engine revs | On | Unit htr | Qheat max | 0 | 0 | |
| 6: First valve opening, with heating | On | Radia + bypa + unit htr | Qheat max | Regulation | Regulation | |
| 7: Regulation (engine T°), with heating | On | Radia + bypa + unit htr | Qheat max | Regulation | Regulation | |
| 8: Vehicle stationary, engine off, with heating | On | Unit htr | Qheat max | 0 | 0 | |
| 9: Engine overheat at low revs | Off | Radia | 0 | Qmax | 0 | |
| 10: Safety (ditto 9) | Off | Radia | 0 | Qmax | 0 | |
| 0: Cold starting with no engine flow rate | Off | 0 | 0 | 0 | 0 | As an option |

The flow cross sections of the valve, when at least two branches are communicating, are calculated in such a way as to limit the pressure difference between the inlet and the outlet of the valve, below 1 bar, so as not to create too much torque, greater than 1 Nm, at the actuator level.

The sequence of operations of Table 2, like that of Table 1, may be effected either with an adjustment member 34 of the hollow cylinder type as described above, or else with any other type of adjustment member, in particular a member of the disk type.

Reference is now made to FIG. 9 which represents a flow chart of the operation of the control means associated with the valve 10.

The flow chart shows that the valve 10 is initialized in a pre-regulation known position. First means of comparison C1 make it possible to compare the temperature of the cooling fluid T water with respect to a critical temperature T water critical which corresponds to the maximum value that the engine can tolerate as a function of the so-called "material" temperature which corresponds to the temperature of the engine. In all cases, the critical temperature of the cooling fluid must remain below its boiling temperature. In the example, the cooling fluid is regarded as being water plus an antifreeze.

These first means of comparison C1 compare T water with T water critical. If T water is greater than T water critical, the control means bring the valve automatically to the "safety" position so as to favor the cooling of the engine and the demisting of the cabin, if necessary.

Otherwise, the second means of comparison C2, which determine the heating requirement, compare the temperature of the cabin T cab with a temperature T cab preset. T cab represents the temperature measured in the cabin, whereas T cab preset represents a cabin temperature preset.

If T cab is greater than T cab preset, third means of comparison C3 determine whether the heating is ineffective, by comparing the temperature T water with a minimum threshold temperature T min threshold which corresponds to the minimum temperature of the engine cooling fluid, below which no purpose is served by circulating water around the unit heater, the rising of the engine temperature then being encouraged.

If T water is less than T min threshold, then the valve is brought into the "bypass" position P1 or into a "zero flow rate" position P0 or P04 closing the three pathways and completely shutting off the engine flow rate.

Otherwise, fourth means of comparison C4, which determine the limitation of the unit heater flow rate, compare the engine revs RPM engine with a threshold RPM preset.

If RPM engine is greater than the threshold RPM preset, means of comparison C5 compare the temperature T water with a preset temperature T preset, which corresponds to a water temperature preset temperature calculated by the engine cooling computer or the engine computer as a function of diverse parameters that correspond to the engine and to the vehicle. These parameters may comprise in particular the engine load (intake pressure, throttle or pedal position, engine revs, speed of the vehicle, operation of the air conditioning, pressure of the refrigerant fluid, exterior temperature, etc.).

If T water is greater than T preset, the valve is brought to the "radiator+bypass+unit heater" position (position P6).

Otherwise, the valve is brought into a "unit heater+bypass" position.

In the case where RPM engine is below the threshold RPM preset, means of comparison C6 compare T water with T preset. If T water greater than T preset, the valve is brought to the "unit heater+radiator" position P7. Otherwise, the valve is brought to the "unit heater" position, that is to say P8 or P5'.

In the case where T cab is less than T cab preset, means of comparison C7 compare T water with T preset. If T water greater than T preset, the valve is brought into a "radiator+unit heater" position, that is to say into a position P3 lying between P1 and P9. Otherwise, the valve is brought into the "bypass" position which corresponds to the position P1.

Of course, variant embodiments of the invention are possible. In particular, the adjustment member is not limited to a hollow cylinder; it may be solid and truncated by a plane.

The invention claimed is:

1. A control valve of a cooling circuit of a motor vehicle combustion engine, the circuit being traversed by a cooling fluid and comprising a first branch (70) which contains an engine cooling radiator (72) for cooling the engine (62), a second branch (76) which constitutes a bypass of the engine cooling radiator (72), and one or more third branches (78), each of which contains at least one unit heater (80) for heating a motor vehicle cabin, wherein the valve (10) comprises a body having a fluid inlet (28), a first outlet (18) connected to the second branch (76), a second outlet (20) connected to the first branch (70) and at least one third outlet (22) connected to the third branch or branches (78), as well as an adjustment member (34) mounted rotatably in the valve body so as to selectively control the outlets (18, 20, 22), and wherein the adjustment member (34) takes the following positions occurring in a sequence when rotated in a given direction:

a "bypass" position (P1), at which the first outlet (18) is open, followed in the sequence by;

a "radiator+bypass" position (P2; P3), at which the first outlet (18) and the second outlet (20) are open, followed in the sequence by;

a "radiator" position (P9; P10'), at which the second outlet (20) is open, followed in the sequence by;

a "radiator+unit heater" position (P4; P10), at which the second outlet (20) and the third outlet (22) are open, followed in the sequence by;

a "radiator+bypass+unit heater" position (P6; P7), at which the first outlet (18), the second outlet (20) and the third outlet (22) are open, followed in the sequence by;

a "unit heater+bypass" position (P5), at which the first outlet (18) and the third outlet (22) are open, and followed in the sequence by;

a "unit beater" position (P5'; P8), at which the third outlet (22) is open.

2. The control valve as claimed in claim 1, wherein the adjustment member takes a "safety" position (P10) which corresponds to the "radiator+unit heater" position, at which the second outlet (20) and the third outlet (22) are open.

3. A control valve of a cooling circuit of a motor vehicle combustion engine, the circuit being traversed by a cooling fluid and comprising a first branch (70) which contains an engine cooling radiator (72) for cooling the engine (62), a second branch (76) which constitutes a bypass of the engine cooling radiator (72), and one or more third branches (78), each of which contains at least one unit heater (80) for heating a motor vehicle cabin, wherein the valve (10) comprises a body having a fluid inlet (28), a first outlet (18) connected to the second branch (76), a second outlet (20) connected to the first branch (70) and at least one third outlet (22) connected to the third branch or branches (78), as well as an adjustment member (34) mounted rotatably in the valve body so as to selectively control the outlets (18, 20, 22), and wherein the adjustment member (34) takes the following positions occurring in a sequence when rotated in a given direction:
- a "bypass" position (P1), at which the first outlet (18) is open, followed in the sequence by;
- a "radiator+bypass" position (P2; P3), at which the first outlet (18) and the second outlet (20) are open, followed in the sequence by;
- a "radiator" position (P9; P10'), at which the second outlet (20)) is open, followed in the sequence by;
- a "radiator+unit heater" position (P4; P10), at which the second outlet (20) and the third outlet (22) are open, followed in the sequence by;
- a "radiator+bypass+unit heater" position (P6; P7), at which the first outlet (18), the second outlet (20) and the third outlet (22) are open, followed in the sequence by;
- a "unit heater+bypass" position (P5), at which the first outlet (18) and the third outlet (22) are open, and followed in the sequence by;
- a "unit heater" position (P5'; P8), at which the third outlet (22) is open;

wherein the adjustment member takes a "safety" position (P10) which corresponds to the "radiator+unit heater" position, at which the second outlet (20) and the third outlet (22) are open, and, wherein the adjustment member takes a "safety" position (P10') which corresponds to the "radiator" position, at which the second outlet (20) is open.

4. The control valve as claimed in claim 1, which comprises control means suitable for bringing the adjustment member (34):
- either into one of the positions; "bypass" (P1), "radiator+bypass", "radiator" (P9), when a no-heating mode is desired,
- or into one of the positions: "radiator+unit heater" (P4; P10), "radiator+bypass+unit heater", "unit heater+bypass" (P5), "unit heater" (P5'; P8), when a with-heating mode is desired.

5. The control valve as claimed in claim 1, wherein the fluid outlets (18, 20, 22) run into the body (12) through openings of chosen shapes and dimensions, made at chosen locations of said body (12).

6. The control valve as claimed in claim 5, wherein the openings of the fluid outlets (18, 20, 22) are of circular general shape and have different diameters.

7. A control valve of a cooling circuit of a motor vehicle combustion engine, the circuit being traversed by a cooling fluid and comprising a first branch (70) which contains an engine cooling radiator (72) for cooling the engine (62), a second branch (76) which constitutes a bypass of the engine cooling radiator (72), and one or more third branches (78), each of which contains at least one unit heater (80) for heating a motor vehicle cabin, wherein the valve (10) comprises a body having a fluid inlet (28), a first outlet (18) connected to the second branch (76), a second outlet (20) connected to the first branch (70) and at least one third outlet (22) connected to the third branch or branches (78), as well as an adjustment member (34) mounted rotatably in the valve body so as to selectively control the outlets (18, 20, 22), and wherein the adjustment member (34) takes the following positions occurring in a sequence when rotated in a given direction:
- a "bypass" position (P1), a which the first outlet (18) is open, followed in the sequence by;
- a "radiator+bypass" position (P2; P3), at which the first outlet (18) and the second outlet (20) are open, followed in the sequence by;
- a "radiator" position (P9; P10'), at which the second outlet (20) is open, followed in the sequence by;
- a "radiator+unit heater" position (P4; P10), at which the second outlet (20) and the third outlet (22) are open, followed in the sequence by;
- a "radiator+bypass+unit heater" position (P6; P7), at which the first outlet (18), the second outlet (20) and the third outlet (22) are open, followed in the sequence by;
- a "unit heater+bypass" position (P5), at which the first outlet (18) and the third outlet (22) are open, and followed in the sequence by;
- a "unit heater" position (P5'; P8), at which the third outlet (22) is open, which comprises motorization means (MPP) suitable for driving the adjustment member (34) so as to bring it into chosen angular positions with respect to the valve body (12).

8. A control valve of a cooling circuit of a motor vehicle combustion engine, the circuit being traversed by a cooling fluid and comprising a first branch (70) which contains an engine cooling radiator (72) for cooling the engine (62), a second branch (76) which constitutes a bypass of the engine cooling radiator (72), and one or more third branches (78), each of which contains at least one unit heater (80) for heating a motor vehicle cabin, wherein the valve (10) comprises a body having a fluid inlet (28), a first outlet (18) connected to the second branch (76), a second outlet (20) connected to the first branch (70) and at least one third outlet (22) connected to the third branch or branches (78), as well as an adjustment member (34) mounted rotatably in the valve body so as to selectively control the outlets (18, 20, 22), and wherein the adjustment member (34) takes the following positions occuring in a sequence when rotated in a given direction:
- a "bypass" position (P1), at which the first outlet (18) is open, followed in the sequence by;
- a "radiator+bypass" position (P2; P3), at which the first outlet (18) and the second outlet (20) are open, followed in the sequence by;
- a "radiator" position (P9; P10'), at which the second outlet (20) is open, followed in the sequence by;
- a "radiator+unit heater" position (P4; P10), at which the second outlet (20) and the third outlet (22) are open, followed in the sequence by;
- a "radiator+bypass+unit heater" position (P6; P7), at which the first outlet (18), the second outlet (20) and the third outlet (22) are open, followed in the sequence by;
- a "unit heater+bypass" position (P5), at which the first outlet (18) and the third outlet (22) are open, and followed in the sequence by
- a "unit heater" position (P5'; P8), at which the third outlet (22) is open, which comprises motorization means (MPP) suitable for driving the adjustment member (34) so as to bring it into chosen angular positions with respect to the valve body (12), and wherein the fluid outlets (18, 20, 22) run into the body (12) through openings of chosen shapes and dimensions, made at chosen locations of said body (12).

9. A control valve of a cooling circuit of a motor vehicle combustion engine, the circuit being traversed by a cooling fluid and comprising a first branch (70) which contains an engine cooling radiator (72) for cooling the engine (62), a second branch (76) which constitutes a bypass of the engine cooling radiator (72), and one or more third branches (78), each of which contains at least one unit heater (80) for heating a motor vehicle cabin, wherein the valve (10) comprises a body having a fluid inlet (28), a first outlet (18) connected to the second branch (76), a second outlet (20) connected to the first branch (70) and at least one third outlet (22) connected to the third branch or branches (78), as well as an adjustment member (34) mounted rotatably in the valve body so as to selectively control the outlets (18, 20, 22), and wherein the adjustment member (34) takes the following positions occurring in a sequence when rotated in a given direction:

a "bypass" position (P1), at which the first outlet (18) is open, followed in the sequence by;

a "radiator+bypass" position (P2; P3), at which the first outlet (18) and the second outlet (20) are open, followed in the sequence by;

a "radiator" position (P9; P10'), at which the second outlet (20) is open, followed in the sequence by;

a "radiator+unit heater" position (P4; P10), at which the second outlet (20) and the third outlet (12) are open, followed in the sequence by;

a "radiator+bypass+unit heater" position (P6; P7) at which the first outlet (18), the second outlet (20) and the third outlet (22) are open, followed in the sequence by;

a "unit heater+bypass" position (P5), at which the first outlet (18) and the third outlet (22) are open, and followed in the sequence by;

a "unit beater" position (P5'; P8), at which the third outlet (22) is open, which comprises motorization means (MPP) suitable for driving the adjustment member (34) so as to bring it into chosen angular positions with respect to the valve body (12), and wherein the fluid outlets (18, 20, 22) run into the body (12) through opening of chosen shapes and dimensions, made at chosen locations of said body (12) and wherein the openings of the fluid outlets (18, 20, 22) are of circular general shape and have different diameters.

10. A cooling circuit for a motor vehicle combustion engine (62), which is traversed by a cooling fluid under the action of a circulation pump (64; 66), which circuit comprises the control valve (10) as claimed in claim 1, whose fluid inlet (28) is connected to an intake (68) for cooling fluid coming from the engine (62) and whose first fluid outlet (18), second fluid outlet (20) and third fluid outlet or outlets (22) are connected respectively to a first branch (70) which contains the cooling radiator (72) for the engine (62), a second branch (76) which constitutes a bypass of the engine cooling radiator (72), and one or more third branches (78) which each contain at least one unit heater (80) for heating the cabin.

11. The cooling circuit as claimed in claim 10, which comprises a mechanical circulation pump (64) driven by the engine (62).

12. A method of controlling fluid flow in a cooling circuit in a motor vehicle wherein the circuit being traversed by a cooling fluid during the various operating phases of engine operation comprises: a first branch (70) which contains the radiator (72) for cooling the engine (62): a second branch (76) which constitutes a bypass of the engine cooling radiator (72): and one or more third branches (78) which each contain at least one unit heater (80) for heating the cabin, and wherein the cooling circuit has a control valve (10) comprising a body having a fluid inlet (28), a first outlet (18) connected to the second branch (76), a second outlet (20) connected to the first branch (70) and at least one third outlet (22) connected to the third branch or branches (78), and an adjustment member (34) mounted rotatably in the valve body so as to selectively control the outlets (18, 20, 22), such that the adjustment member (34) takes the following positions occuring in a sequence when rotated in a given direction:

first, opening to a "bypass" position (P1), at which the first outlet (18) is open, followed in the sequence by;

second, opening to a "radiator+bypass" position (P2; P3), at which the first outlet (18) and the second outlet (20) are open, followed in the sequence by;

third, opening to a "radiator" position (P9; P10'), at which the second outlet (20) is open, followed in the sequence by;

fourth, opening to a "radiator+unit heater" position (P4; P10), at which the second outlet (20) and the third outlet (22) are open, followed in the sequence by;

fifth, opening to a "radiator+bypass+unit heater" position (P6; P7), at which the first outlet (18), the second outlet (20) and the third outlet (22) are open, followed in the sequence by;

sixth, opening to a "unit heater+bypass" position (P5), at which the first outlet (18) and the third outlet (22) are open, and followed in the sequence by;

seventh, opening to a "unit heater" position (P5'; P8), at which the third outlet (22) is open.

13. A method as claimed in claim 12, wherein the adjustment takes a "zero flow rate" position (P10), at which no outlet is open.

14. A method as claimed in claim 12, wherein the adjustment member takes a "safety" position (P10) which corresponds to the "radiator+unit heater" position, at which the second outlet (20) and the third outlet (22) are open.

15. A method as claimed in claim 13, wherein the adjustment member of the control valve is suitable for taking a "safety" position (P10') which corresponds to the "radiator" position, at which the second outlet (20) is open.

16. A method as claimed in claim 12, wherein the adjustment member (34) is brought by a control means:

either into one of the positions "bypass" (P1), "radiator+bypass", "radiator" (P9), when a no-heating mode is desired; or into one of the positions "radiator+unit heater" (P4; P10), "radiator+bypass+unit heater", "unit heater+bypass" (P5), "unit heater" (P5; P8), when a with-heating mode is desired.

* * * * *

UNITED STATES PATENT AND TRADEMARK OFFICE
CERTIFICATE OF CORRECTION

| | | |
|---|---|---|
| PATENT NO. | : 7,984,700 B2 | Page 1 of 1 |
| APPLICATION NO. | : 11/430381 | |
| DATED | : July 26, 2011 | |
| INVENTOR(S) | : Matthieu Chanfreau et al. | |

It is certified that error appears in the above-identified patent and that said Letters Patent is hereby corrected as shown below:

Cover Page, add item (63) Related U.S. Application Data
  Continuation of application No. 10/483,375, on 05/06/2004 which is a 371 of PCT/FR02/02431, filed on 07/10/2002.

Cover Page, add item (30) Foreign Application Priority Data
  July 11, 2001 (FR)     0109221

IN THE CLAIMS

Column 10, line 48, after "unit," please delete "beater" and insert therein -- heater --

Column 11, line 27, after "open," please delete "and," and insert therein -- and --

Column 11, line 34, after "of the," please delete "positions;" and insert therein -- positions: --

Column 11, line 66, after "(P1)," please delete "a" and insert therein -- at --

Column 12, line 55, after "sequence," please delete "by" and insert therein -- by; --

Column 13, line 24, after "third outlet," please delete "(12)" and insert therein -- (22) --

Column 13, line 33, after "unit," please delete "beater" and insert therein -- heater --

Column 13, line 41, after "through" please delete "opening" and insert therein -- openings --

Column 13, line 42, after "circular" please delete "general" and insert therein -- general --

Column 14, line 56, after "unit heater" please delete "(P5; P8)" and insert therein
-- (P5'; P8) --

Signed and Sealed this
Eighth Day of January, 2013

David J. Kappos
*Director of the United States Patent and Trademark Office*